(12) United States Patent
Jeremic

(10) Patent No.: US 10,400,431 B2
(45) Date of Patent: Sep. 3, 2019

(54) INSERT WITH ROTATING MESH AND ROTATING MESH FOR AERATORS IN SANITARY BATTERIES

(71) Applicant: Neoperl GmbH, Mullheim (DE)

(72) Inventor: Dragan Jeremic, Sentvid pri Sticni (SI)

(73) Assignee: Neoperl GmbH, Müllheim (DE)

( * ) Notice: Subject to any disclaimer, the term of this patent is extended or adjusted under 35 U.S.C. 154(b) by 598 days.

(21) Appl. No.: 14/774,449

(22) PCT Filed: Feb. 28, 2014

(86) PCT No.: PCT/SI2014/000012
§ 371 (c)(1),
(2) Date: Sep. 10, 2015

(87) PCT Pub. No.: WO2014/142766
PCT Pub. Date: Sep. 18, 2014

(65) Prior Publication Data
US 2016/0024768 A1    Jan. 28, 2016

(30) Foreign Application Priority Data

Mar. 12, 2013 (SI) .................................. P-201300054
Sep. 16, 2013 (SI) .................................. P-201300266
(Continued)

(51) Int. Cl.
*E03C 1/084* (2006.01)
*E03C 1/086* (2006.01)
(Continued)

(52) U.S. Cl.
CPC .............. *E03C 1/084* (2013.01); *B01D 29/01* (2013.01); *B01D 29/66* (2013.01); *B01D 29/70* (2013.01); *E03C 1/086* (2013.01); *E03C 2201/40* (2013.01)

(58) Field of Classification Search
CPC ...... E03C 1/084; E03C 1/086; E03C 2201/40; E03C 1/026; B01D 29/01; B01D 29/70;
(Continued)

(56) References Cited

U.S. PATENT DOCUMENTS 1,250,222 A * 12/1917 Rahner ..................... E03B 9/20
239/32
2,247,311 A * 6/1941 Rockwood ............. E03C 1/084
239/428
(Continued)

FOREIGN PATENT DOCUMENTS

CH          447964        3/1968
DE          1247271       8/1967
(Continued)

OTHER PUBLICATIONS

C. Otto Gehrckens, O-Ring Basics, May 2012, C. Otto Gehrckens, cover, two paragraphs in General, 1 paragraph in Description, 3 paragraphs, two figures in How they work.*
(Continued)

*Primary Examiner* — Chee-Chong Lee
*Assistant Examiner* — Joseph A Greenlund
(74) *Attorney, Agent, or Firm* — Volpe and Koenig, P.C.

(57) ABSTRACT

The insert with a rotating mesh for aerators in sanitary fixtures consists of the housing (1) of an insert, the rotating screen (5) and o-ring (6). The housing (1) of an insert has at its bottom part i.e. at the water outlet of the sanitary fixture, two bearings (2) made, the rim (4) for installing a flat sealing between the sanitary fixture and the body of aerator. The rotating mesh (5) has on its rim circumference, preferentially at the most extended part of the rotating mesh (5), i.e. at the extension of diameter of the mesh (5) two axles (7) positioned which fit into the bearings (2) in the housing (1) of the insert, and serve for axle fixing the rotating mesh (5) and
(Continued)

thus enabling the rotation of the rotating mesh (5) around the axles (7); the rotating mesh (5) has on its outer circumference, in the upper part, a groove (11) cut, in which o-ring seal (6) is installed for sealing the rotating mesh (5) to the housing (1) of the insert. Optionally, the rotating mesh (5) can include on its circumference, i.e. at the water outlet of the sanitary fixture, also the intake channel (15) for air supply. The intake of air for aeration is provided from the bottom side laterally. Optionally a rotating mesh can be installed directly in the aerator's body without an insert. In this context, the rotating mesh (5) is fixed axially with two screws (12) directly in the body (13) of the aerator in a way that it is rotatable around its axis.

9 Claims, 5 Drawing Sheets

(30) Foreign Application Priority Data

| Sep. 16, 2013 | (SI) | P-201300267 |
|---|---|---|
| Oct. 28, 2013 | (SI) | P-201300355 |
| Nov. 25, 2013 | (SI) | P-201300395 |

(51) Int. Cl.
    *B01D 29/66* (2006.01)
    *B01D 29/70* (2006.01)
    *B01D 29/01* (2006.01)

(58) Field of Classification Search
    CPC ........ B01D 29/66; B01D 27/01; B01D 27/66;
                         B01D 27/70; B05B 7/0062
    USPC .................. 239/428.5, 419.5, 575
    See application file for complete search history.

(56) References Cited

U.S. PATENT DOCUMENTS

| 2,423,650 | A | * | 7/1947 | Hurst | B01F 5/0408 |
|---|---|---|---|---|---|
| | | | | | 239/428.5 |
| 2,747,930 | A | * | 5/1956 | Hyde | E03B 9/20 |
| | | | | | 239/27 |
| 2,816,746 | A | * | 12/1957 | Botnick | E03C 1/08 |
| | | | | | 239/428.5 |
| 2,962,224 | A | * | 11/1960 | Aghnides | E03C 1/084 |
| | | | | | 239/428.5 |
| 3,130,915 | A | * | 4/1964 | Aghnides | E03C 1/084 |
| | | | | | 239/427 |
| 3,276,697 | A | * | 10/1966 | Aghnides | E03C 1/084 |
| | | | | | 239/428.5 |
| 3,428,089 | A | * | 2/1969 | Kachergis | B01D 35/043 |
| | | | | | 137/562 |
| 3,533,559 | A | * | 10/1970 | Caird | A62C 31/02 |
| | | | | | 239/419.5 |
| 4,351,727 | A | * | 9/1982 | Brogger | B01D 35/043 |
| | | | | | 137/550 |
| 4,605,200 | A | * | 8/1986 | Huppee | E03C 1/052 |
| | | | | | 137/523 |
| 4,722,794 | A | * | 2/1988 | Duncan | F16K 5/0407 |
| | | | | | 137/550 |
| 4,806,258 | A | * | 2/1989 | Duncan | F16K 5/0407 |
| | | | | | 137/550 |
| 5,188,335 | A | * | 2/1993 | Pettinaroli | F16K 35/06 |
| | | | | | 137/315.18 |
| 5,361,801 | A | * | 11/1994 | Kerpan | B01D 29/117 |
| | | | | | 137/547 |
| 5,361,804 | A | * | 11/1994 | Keller | E03C 1/08 |
| | | | | | 137/801 |
| 8,006,922 | B2 | | 8/2011 | Katzer | |
| 8,047,228 | B2 | * | 11/2011 | Depierri | B01J 8/002 |
| | | | | | 137/547 |
| 8,177,141 | B2 | * | 5/2012 | Hagaman | B05B 1/3013 |
| | | | | | 239/18 |
| 8,205,810 | B2 | * | 6/2012 | Lacher | E03C 1/08 |
| | | | | | 239/428.5 |
| 2006/0016496 | A1 | * | 1/2006 | Shane | E03C 1/086 |
| | | | | | 137/801 |
| 2007/0108314 | A1 | * | 5/2007 | Cutler | E03C 1/0404 |
| | | | | | 239/428.5 |
| 2007/0194165 | A1 | * | 8/2007 | Lee | B65H 35/0026 |
| | | | | | 242/411 |
| 2016/0024768 | A1 | * | 1/2016 | Jeremic | B01D 29/01 |
| | | | | | 134/32 |
| 2018/0282986 | A1 | * | 10/2018 | Blum | E03C 1/086 |

FOREIGN PATENT DOCUMENTS

| DE | 1658154 | 8/1970 |
|---|---|---|
| EP | 0190965 | 8/1986 |
| EP | 1596014 | 11/2005 |
| GB | 2075854 | 11/1981 |
| RU | 2047701 | 11/1995 |
| WO | 2006092316 | 9/2006 |

OTHER PUBLICATIONS

Wikipedia, Allowance engineering, Sep. 22, 2007, Wikipedia, 2 paragraphs.*
Schuetz, Gaging Diameter Variation in Machined Holes, Feb. 5, 2003, Modern Machine Shop, sentence describing tolerances for machined holes.*
Wiikipedia, Surface Finish, Nov. 8, 2014, Wikipedia, surface fniish paragraph, surfae roughness paragraph, measurement paragraph.*

* cited by examiner

INSERT WITH ROTATING MESH AND ROTATING MESH FOR AERATORS IN SANITARY BATTERIES

BACKGROUND

An insert with a rotating mesh fits in the domain of water supply installations that is in the area of water supply plumbing. The insert with rotating mesh is set in an aerator, which is positioned at the tip of a water faucet or a sanitary fixture in order to clean drinking water of mechanical particles, which are occasionally found in the water. It also provides for water aeration, regulates the water flow and directs the water current at the outlet of sanitary fixture. The insert with a rotating mesh allows fitting into all standard bodies of aerators which are positioned at the sanitary fixture's efflux.

The invention solves a technical problem thanks to the design of the insert with a rotating mesh which allows, by its regular cleaning, disposal of deposited solid particles which may be present in drinking water. In this capacity there is no need of unscrewing the insert from an aerator, but only to turn the rotating mesh in the aerator's body or in the insert's housing. Having done this, water current itself flushes solid particles from the mesh surface whereupon the mesh, being cleaned in this manner is fixed again within the aerator's body or in the insert housing. The term rotating mesh applies to an assembly having either one mesh or more meshes, sprayers and micro screens, which are set in layers one above the other, thus forming an assembly of a rotating mesh. Optionally, a rotating mesh may also have on its rim circumference incoming inlets for air supply, where outcoming water from the sanitary fixture takes the air for aerating laterally from below. By pressing the rotating mesh or by pushing the handle on the rotating mesh one can turn it and the stream of the water flash cleans the mechanical particles from the mesh. Cleaning the aerator is faster and its maintenance is much simpler comparing with the existent aerator's inserts. Due to much simpler cleaning of aerators on the sanitary fixture, higher quality of drinking water is obtained on its outlet, together with its longer life-cycle. Everyday simple cleaning of the mesh prevents formation of bacterial biofilms which are usually packed at the aerator's outlet.

SUMMARY

Known aerators for sanitary fixtures are standard aerators which fit into an aerator's body and are screwed on the tip of a sanitary fixture, so that without unscrewing the aerator's body, the aerator could not be either moved or turned in any direction. It is not possible to turn the inner side of an aerator into reverse position on the outside tip of a sanitary fixture, without having unscrewed the aerator's body. Yet, there exist aerators, where merely the mesh could be removed or unscrewed in order to either clean or replace it. There also exist aerators that nevertheless have a rotating mesh which turns around its axles but not more than 7 degrees. This function is meant solely for altering the direction of the water flow at the outlet of a sanitary fixture as it does not render placing the screen in the cleaning position within the aerator's body. Known are the aerators, which are fixed directly on the outlet of a sanitary fixture, where the aerator's body is tied to the housing of a sanitary fixture in a manner which does not allow disassembling and assembling such aerators without using a tool.

The installation of the insert with the rotating mesh according to the invention in an aerator's body enables cleaning it without applying any tool or other contrivance as is the regular case with the existent aerators or aerator's inserts.

BRIEF DESCRIPTION OF THE DRAWINGS

The invention is described more in depth and in detail in the following examples and in the figures, which show.

DETAILED DESCRIPTION OF THE PREFERRED EMBODIMENTS

Figure 1:
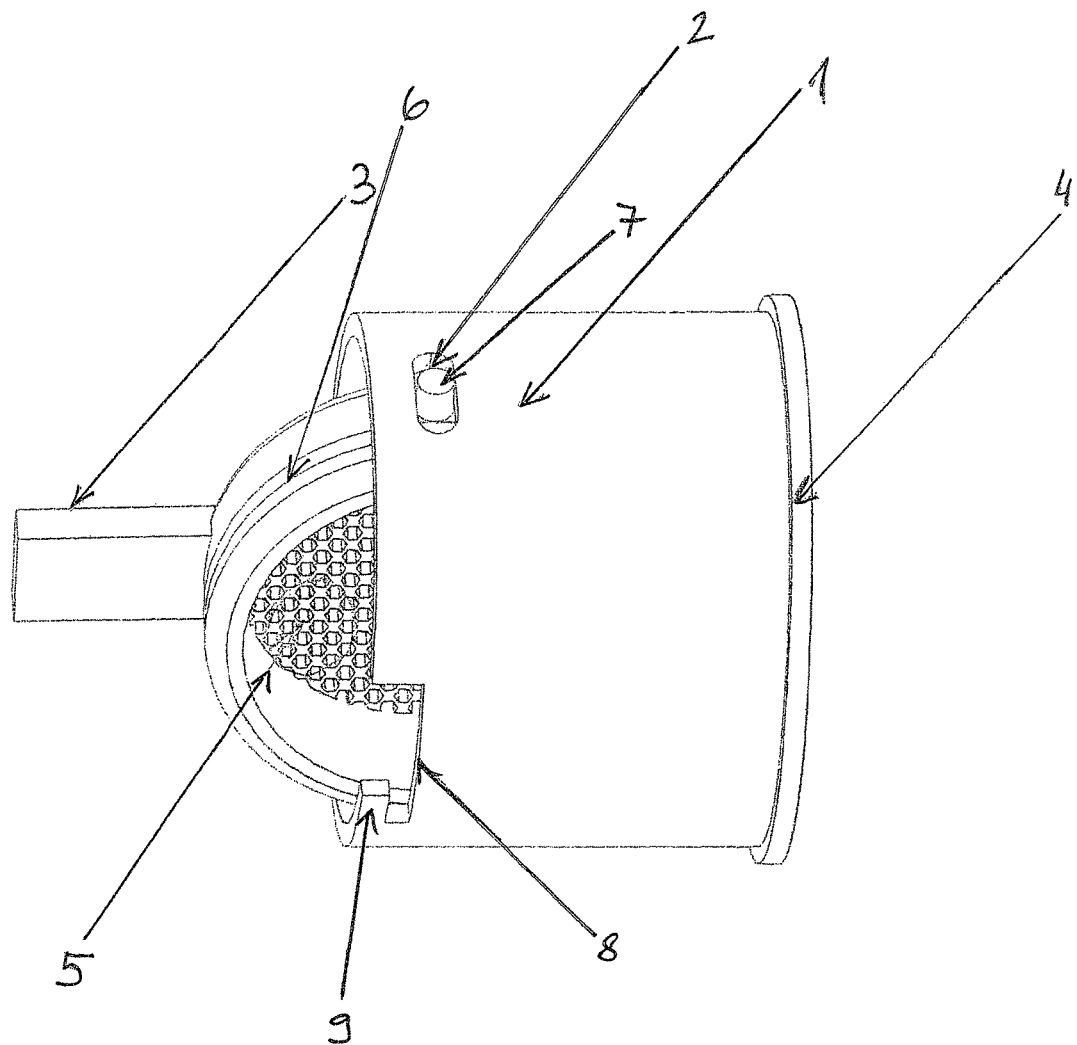
FIG. 1: insert with a rotating mesh

The insert with a rotating mesh is shown in FIG. 1 and consists of: housing 1 of the insert, rotating mesh 5 and o-ring seal 6. The housing 1 is made of injection molded plastics, which employment is convenient for drinking water, and is designed according to the prescribed standards for aerator's inserts. The housing 1 of the insert has at its lower part, i.e. at the water outlet of a sanitary fixture, two bearings 2 for accepting the axles 7 of a mesh 5. The bearings 2 are of an oval form, where the smaller dimension of the oval is 1% to 5% larger than the diameter of axles 7 of the mesh 5. Thus easier mounting of the axles 7 in the bearing 2 and the rotation of the axles 7 in the bearing 2 is enabled. The rim 4 functions for fixing a flat seal in order to obtain better tightening between the sanitary fixture and the aerator's body at installing the insert with a rotating mesh 5 in the aerator's body. The housing 1 of the insert has in its lower edge a groove 8 with a tooth 9 designed for accepting a handle 3 of the mesh 5, which serves for fixing the rotating mesh 5 in its working position.

Figure 2:
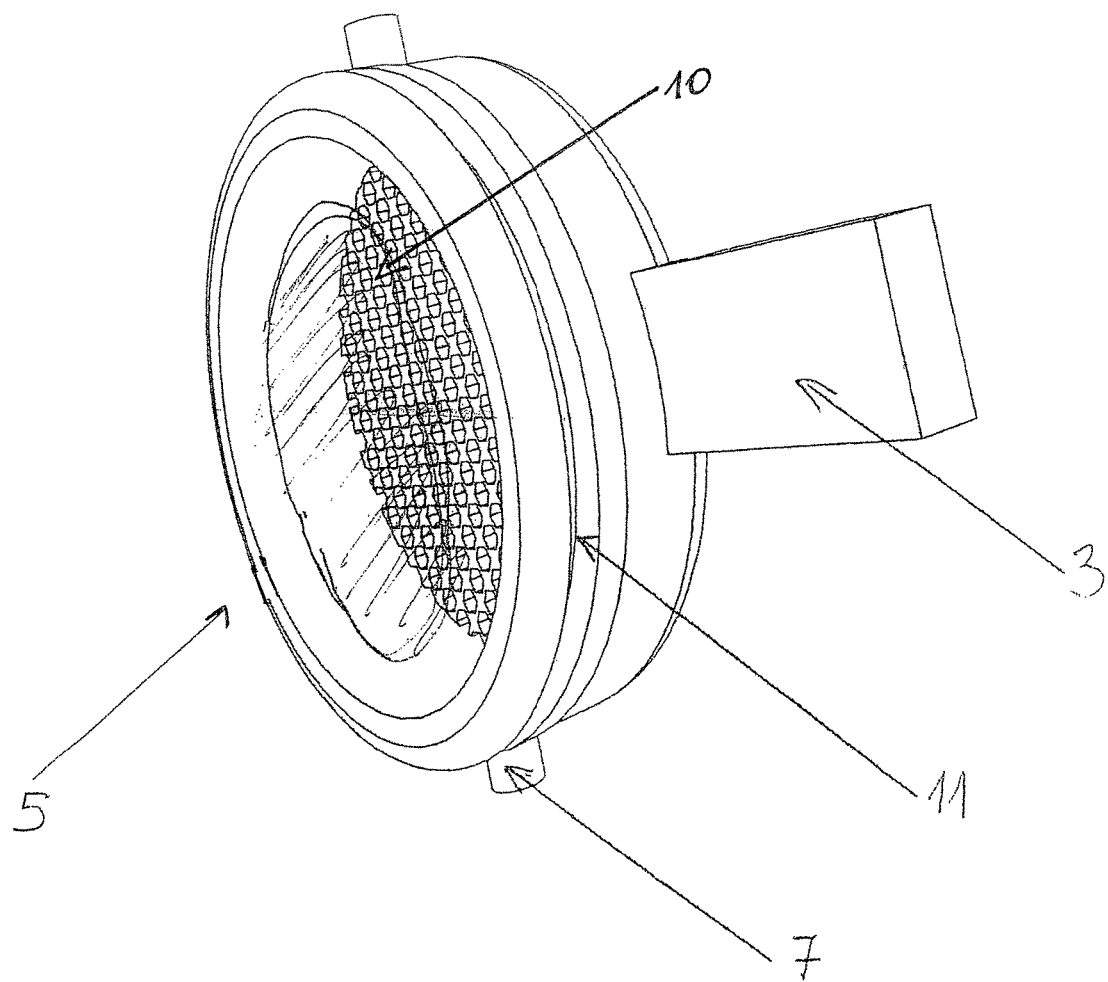
FIG. 2: rotating mesh

The rotating mesh 5, shown in the FIG. 2, has at its rim circumference two axles 7, which fit into the bearings 2 of the housing 1 of the insert and serve for pivotably fixing the rotating mesh 5. The axles 7 are preferentially formed at the widest part of the mesh 5, i.e. at the extension of the diameter of the mesh 5, in a way that if the axles 7 were interconnected, the connecting line would seemingly pass through the center of the mesh 5. Rotating mesh 5 so mounted allows the rotation of the rotating mesh 5 around the axles 7. In this way cleaning of the rotating mesh 5 with the water current coming from the sanitary fixture is enabled. Optionally, the axles 7 could be positioned also in the area of up to 10% of the diameter of the mesh 5 above or below, meaning that the connecting line between the axles 7 moves up to 10% above or below from the center of the mesh 5. In this case, the rotation of the mesh 5 around its axis is limited, but nevertheless sufficient to allow adequate cleaning of the rotating mesh 5 by the water current coming out from a sanitary fixture. The axles 7 could be positioned at any point of the circumference of the mesh 5, providing that the axles 7 are in the same line, i.e. if the axles 7 were interconnected, the imaginary connecting line is strait line. Within the scope of the invention there is also the construction where the axles 7 are coupled together in one piece and are positioned between the mesh 5 and the housing 1 of the insert, rendering thus a hinge.

The design of the bearings 2 in an oval form enables movements of the mesh 5 also in horizontal direction alongside the longer oval dimension. The movement in horizontal direction is required in order to allow position changes of the mesh 5 when it is cleaned. The rotating mesh 5 has in the lower part of its circumference, i.e. at the water outlet of the sanitary fixture, the handle 3, which fits into the groove 8 in a way that the tooth 9 keeps the handle 3 in a firm position. In this manner the rotating mesh 5 is fixed in the housing 1 of the insert, securing thus its working position. Oval design of the bearings 2 enables movements of the mesh 5 thus allowing the tooth 9 to enter into the groove 8.

The rotating mesh 5 has on its outer circumference, in the upper part, a groove 11 cut, in which o-ring seal 6 is installed. The o-ring seal 6 is meant for sealing the rotating mesh 5 to the housing 1 of the insert. The rotating mesh 5 has an inner space 10 in its upper part, which is intended for building in additional meshes, sprayers and micro screens. These all provide for economizing water consumption, better water flow, water aeration in the aerator, and first of all enabling filtering of mechanical parts which are present in drinking water. O-ring 6 seal is made of elastic material, which complies with the standards for drinking water consumption; it has proper elasticity to enable sealing between the rotating mesh 5 and the housing 1 of the insert.

The insert with the rotating mesh according to the invention has thus two sealings which enable sealing between the sanitary fixture and the insert as well as sealing between the insert and the rotating mesh. Sealing can also be performed with other known systems of sealing.

Figure 3:
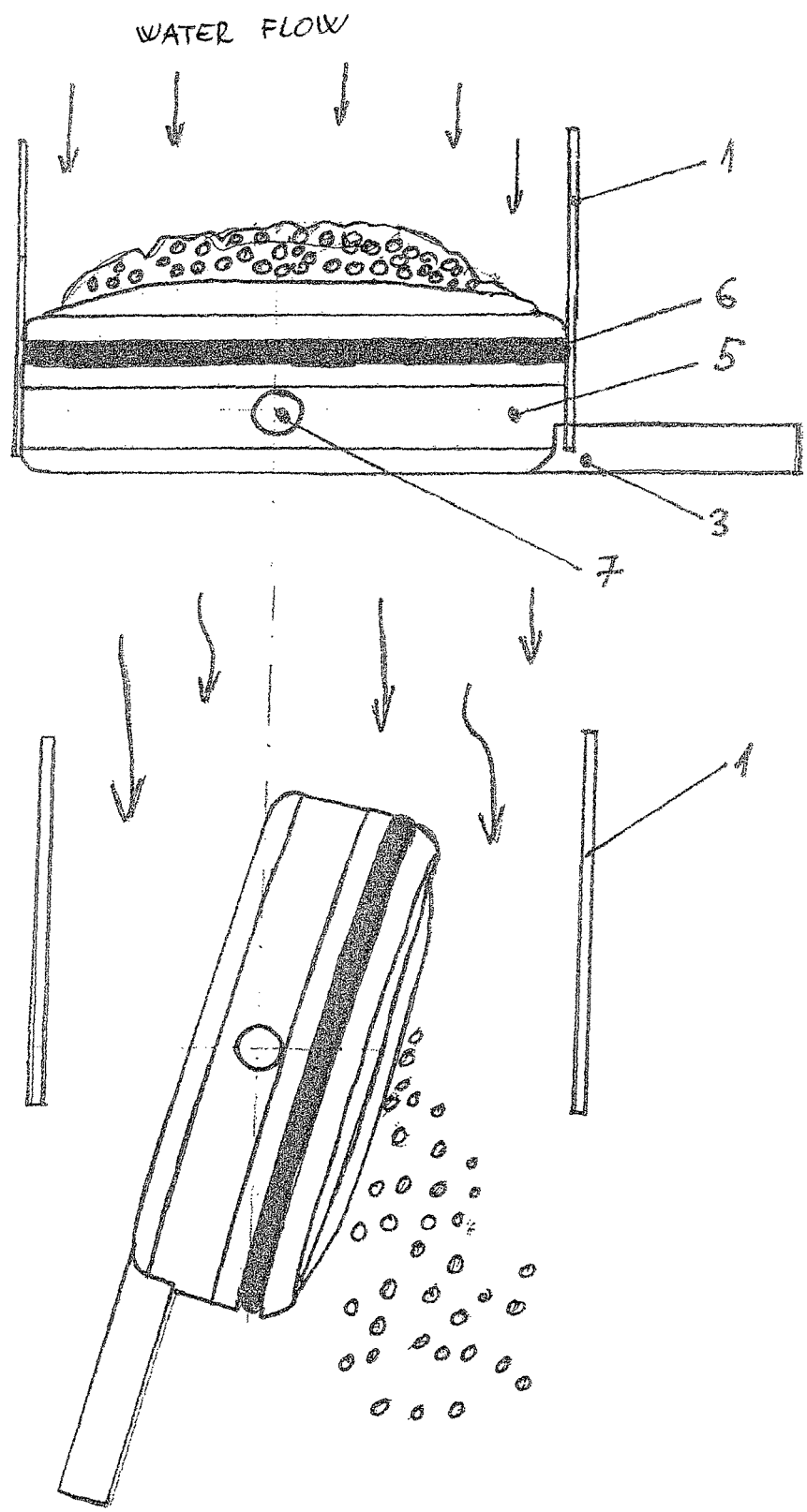
FIG. 3: insert with a rotating mesh in the working position and in the position of cleaning

Operating or cleaning the rotating mesh 5 is simple and is shown in FIG. 3. The handle 3 is pushed with the finger in order to swivel it horizontally, thus the tooth 9 loosens the handle 3 and dislodges it from the groove 8. The rotating mesh 5 is, by pressing the handle 3 in a downward direction, rotated around the axles 7 in the bearings 2 with the help of the handle 3. Due to this rotation, the bottom and upper side of the rotating mesh 5 reverse their sides. Mechanical particles, which have been deposited inside the insert on the upper side of the rotating mesh 5, i.e. on the side, which is facing the interior of the sanitary fixture, are, due to the rotation of the rotating mesh 5 around the axles 7, brought from the inner side of the insert to its outer side. Upper side of the rotating mesh 5 becomes now the bottom side of the rotating mesh 5; mechanical particles are exposed to the water current, and are, with water rinsing, removed from the rotating mesh 5. After the rotating mesh 5 is cleaned, it is turned with the help of the handle 3 in the opposite direction upwards, the handle 3 is moved into the groove 8 so that the tooth 9 fixes the handle 3 and the rotating mesh 5 is fixed in housing 1 of the insert again in working position.

Figure 4:
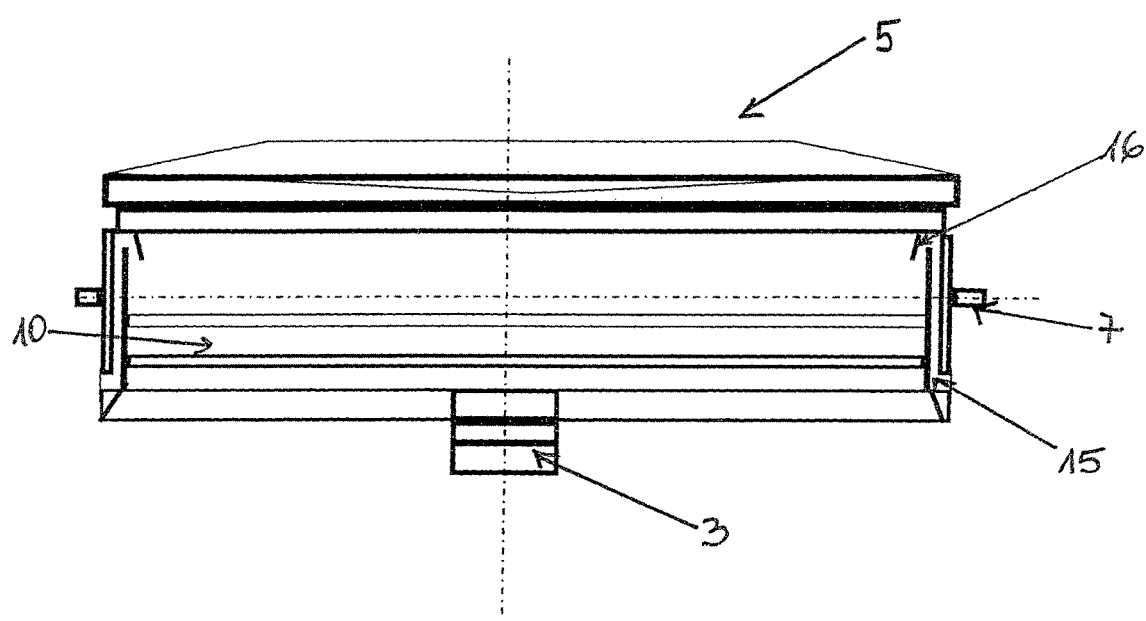
FIG. 4: rotating mesh with an air supply inlet

Optionally the rotating mesh 5 can include on its circumference, i.e. at the water outlet of the sanitary fixture, also the intake channel 15 for air supply. The intake of air for aeration is provided from the bottom side laterally, as shown on FIG. 4. In this case, the circumference of the rotating mesh 5 is designed as a double wall. The outer circumference's wall of the rotating mesh 5 is made shorter in order to provide along the entire length of the wall an opening for the intake of the air which continues in the intake channel 15. The inner wall ends at its upper part in the space for water spraying. For preventing water from entering into the intake channel 15 small tongues 16 are provided in the space for spraying right above the inner wall of the intake channel 15.

Figure 5:
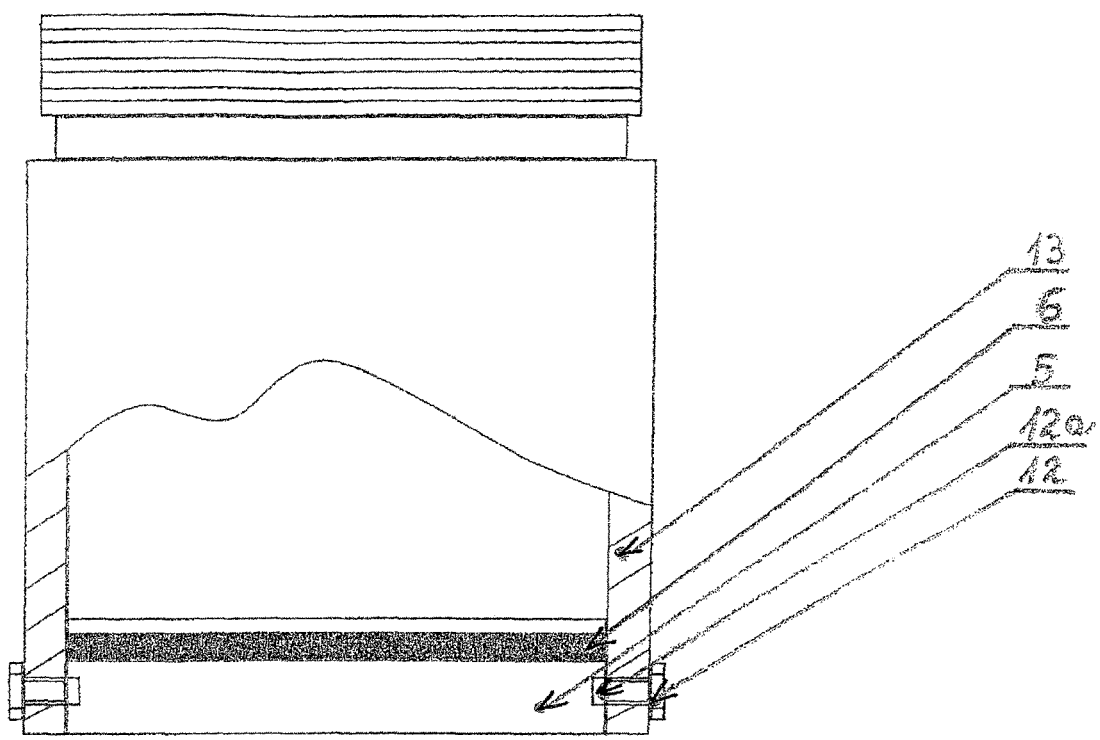
FIG. 5: rotating mesh installed directly into the aerator's body.

Optionally a rotating mesh can be installed directly in the aerator's body without an insert, as shown in FIG. 5. In this context, the rotating mesh 5 is fixed axially with two screws 12 directly in the body 13 of the aerator in a way that it is rotatable around its axis. The screws 12 function as axes 12a to enable rotating the mesh 5 around the axle. The mesh 5 has at its circumference two holes which are actually two bearings with the purpose for accepting the screws 12. There are also other possibilities for axial fixing, i.e. alternatives for axles and bearings, of the mesh 5 in the aerator's body which are familiar to the skilled persons. The o-ring seal 6 enables sealing between the mesh 5 and the body 13 of the aerator and simultaneously fixes the mesh in its working position and cleaning position. Starting with cleaning a mesh, the mesh 5 is pressed into the interior of the aerator's body 13; the pressing force overcomes the o-ring seal's 6 force of tightening thus enabling the rotation of the mesh 5 via by the axis 12a of the screws 12. The mesh 5 turns around for 180 degrees so that the mechanical particles which have amassed on the mesh 5 find themselves on the outer, i.e. bottom side of the aerator. When the mesh 5 has been turned around, the water of the sanitary fixture is opened and the mesh 5 is cleaned by the water current. After the mesh has been cleaned, the water is turned off and with a finger the mesh 5 is presses into the interior of the aerator's body 13, turned around its axis 12a for 180 degrees and positioned in the horizontal station. O-ring seal 6 firmly holds the mesh in its working position.

An advantage of the insert with a rotating mesh is that no technical skill of a user in order to rinse the aerator's mesh is needed and also no need for the use of any tool. Easy and simple cleaning makes it possible for the user's employ and access to aerator's cleaning. By the removal of mechanical particles and bacterial biofilms from the mesh better drinking water is thus obtained. Also there is no risk for damaging the aerator's body for there is no need for its assembling and disessembling. With frequent simple cleaning the quality of drinking water is improved and the sanitary fixture's lifecycle is extended.

The insert with a rotating mesh can be used with all sanitary fixtures, i.e. with all existent as well as with newly installed ones. The insert's dimensions are made in accordance with standard requirement in such a way that the installation in all bodies of standard aerators of sanitary fixtures is enabled, for instance washbasins, bidets, garden faucets, public faucets, washstands/sinks, special sanitary fixtures, push button batteries, sensor water fixtures.

The use of the insert with a rotating mesh is very versatile and widespread. Its application covers industry, medical sector, residential buildings, business buildings, public sector buildings, tourist infrastructure.

The process of manufacturing an insert with a rotating mesh is performed with machines for producing items made from plastics. The process of making an insert and a rotating mesh is conducted by jet injection of liquid plastics into a prior prepared mold. The plastic suitable for drinking water is used. An inner space in the mesh is made for building in yet another mesh and water sprayer. An o-ring seal 6 is installed onto the rotating mesh which is fixed into the groove 11.

The mesh 5 is inserted into the housing 1 of the insert in a manner that the supporting sections of both axles 7 are placed into the bearings 2 of the housing 1 of the insert, which axially hold the mesh in the housing of the insert. The handle 3 engages the tooth 9 in the groove 8.

The insert with a rotating mesh is thus ready for mounting to the standard housing of aerators. The production of an insert starting from the beginning to the packaging of final item is completely automated, which contributes to its manufacturing speed, better quality and efficient logistics. The insert with a rotating mesh in rapidly and simply finalized.

The invention claimed is:

1. An insert with a rotating mesh for aerators in sanitary fixtures, comprising a housing (1), a rotating mesh (5) having axles (7) extending from a rim circumference, and an o-ring seal (6), the housing (1) has two bearings (2) for receiving the axles (7) of the rotating mesh (5) and the axles (7) fit into respective ones of the bearings (2) of the housing (1) and serve for pivotable connection of the rotating mesh (5) such that the rotating mesh (5) is rotatable around the axles (7); the rotating mesh (5) has on the rim circumference, in a second area, a groove (11) in which the o-ring seal (6) is installed for sealing the rotating mesh (5) to the housing (1) of the insert, the rotating mesh further comprising in a first area of the rim circumference thereof a handle (3), and the housing (1) includes a housing groove (8) extending therethrough with a tooth (9) for receiving the handle (3) of the rotating mesh (5) for fixing the rotating mesh (5) in a working position with the handle protruding outside of the housing through the housing groove.

2. The insert with a rotating mesh for aerators in sanitary fixtures according to claim 1, wherein the axles (7) are formed at a widest part of the rotating mesh (5), such that the axles (7) lie on a line that passes through a center of the rotating mesh (5).

3. The insert with a rotating mesh for aerators in sanitary fixtures according to claim 2, wherein the axles (7) are positioned in an area of up to 10% of a diameter of the rotating mesh (5) above or below, such that the line extending between the axles (7) moves up to 10% above or below from the center of the rotating mesh (5).

4. The insert with a rotating mesh for aerators in sanitary fixtures according to claim 2, wherein the axles (7) are positioned at any point of the rim circumference of the rotating mesh (5), providing that the axles (7) are along a same line.

5. The insert with a rotating mesh for aerators in sanitary fixtures according to claim 1, wherein the axles (7) are coupled together in one piece and are positioned between the rotating mesh (5) and the housing (1) of the insert.

6. The insert with a rotating mesh for aerators in sanitary fixtures according to claim 1, wherein the rotating mesh (5) has within the second area an inner space (10) which receives additional meshes, sprayers and micro screens.

7. The insert with a rotating mesh for aerators in sanitary fixtures according to claim 1, wherein the bearings (2) on the housing (1) of the insert define openings that are oval, each said oval having a larger dimension extending in a circumferential dimension of the housing and a smaller dimension, and the smaller dimension of the oval is 1% to 5% larger than a diameter of the axles (7) of the rotating mesh (5) to allow for mounting of the axles (7) in the bearing (2) and the rotation of the axles (7) in the bearing (2) and for movement of the rotating mesh (5) in a direction of the larger dimension of the bearings (2).

8. An insert with a rotating mesh for aerators in sanitary fixtures, comprising a housing (1), a rotating mesh (5) having axles (7) extending from a rim circumference, and an o-ring seal (6), the housing (1) has on a first part two bearings (2) for receiving the axles (7) of the rotating mesh (5) and the axles (7) fit into respective ones of the bearings (2) of the housing (1) and serve for pivotable connection of the rotating mesh (5) such that the rotating mesh (5) is rotatable around the axles (7); the rotating mesh (5) has on the rim circumference, in a second part, a groove (11) in which the o-ring seal (6) is installed for sealing the rotating mesh (5) to the housing (1) of the insert, wherein the rotating mesh (5) includes on the rim circumference an intake channel (15) for air supply, the rim circumference of the rotating mesh (5) includes a double wall having an inner wall and an outer wall; the outer wall is shorter than an overall height of the double wall in order to provide along an entire length of the wall an opening for intake of air which continues in the intake channel (15) and the inner wall ends at a space for water spraying where tongues (16) are provided above the inner wall of the intake channel (15).

9. The process of cleaning the rotating mesh according to claim 1, comprising pushing the handle (3) with a finger in order to swivel the rotating mesh horizontally, with the tooth (9) loosening the handle (3) from the housing groove (8); rotating the rotating mesh (5) by pressing the handle (3) in a downward direction, to rotate the rotating mesh around the axles (7) in the bearings (2); and due to this rotation, a bottom and an upper side of the rotating mesh (5) reversing positions; exposing mechanical particles, which have been deposited inside the insert on the upper side of the rotating mesh (5) to a water current, and, with water rinsing, removing the mechanical particles from the rotating mesh (5); and after the rotating mesh (5) is cleaned, turning the rotating mesh with the help of the handle (3) in an opposite direction upwards, moving the handle (3) into the housing groove (8) so that the tooth (9) fixes the handle (3) and the rotating mesh (5) is fixed in housing (1) of the insert again in the working position.

* * * * *